US011601031B1

(12) United States Patent
Blankenship

(10) Patent No.: US 11,601,031 B1
(45) Date of Patent: Mar. 7, 2023

(54) ALTERNATING POLE ELECTROMAGNETIC ROTARY MOTOR

(71) Applicant: Maxwell Jordan Blankenship, Denver, CO (US)

(72) Inventor: Maxwell Jordan Blankenship, Denver, CO (US)

( * ) Notice: Subject to any disclaimer, the term of this patent is extended or adjusted under 35 U.S.C. 154(b) by 0 days.

(21) Appl. No.: 17/689,638

(22) Filed: Mar. 8, 2022

(51) Int. Cl.
| | | |
|---|---|---|
| *H02K 7/116* | (2006.01) | |
| *H02K 11/30* | (2016.01) | |
| *H02K 7/00* | (2006.01) | |

(52) U.S. Cl.
CPC ............. *H02K 7/116* (2013.01); *H02K 7/003* (2013.01); *H02K 11/30* (2016.01)

(58) Field of Classification Search
CPC ......... H02K 7/116; H02K 7/003; H02K 11/30
USPC .......................................................... 310/83
See application file for complete search history.

(56) References Cited

U.S. PATENT DOCUMENTS

| | | | |
|---|---|---|---|
| 5,258,697 A | 11/1993 | Ford | |
| 7,148,596 B2 | 12/2006 | Minato | |
| 7,629,713 B2 | 12/2009 | Beaulieu | |
| 8,350,502 B2 | 1/2013 | Rabal | |
| 8,674,576 B2 | 3/2014 | Knaia | |
| 10,141,827 B2 * | 11/2018 | Ishak | H02K 99/20 |
| 10,483,831 B2 | 11/2019 | You | |
| 10,965,203 B2 * | 3/2021 | Casarin | H02K 53/00 |
| 11,060,593 B2 * | 7/2021 | Veilleux, Jr. | F16H 57/02 |
| 2010/0231081 A1 * | 9/2010 | Iwata | H02K 21/029 310/191 |
| 2012/0032541 A1 * | 2/2012 | Chen | H02K 7/116 310/83 |
| 2012/0299416 A1 * | 11/2012 | Chen | H02K 7/116 310/83 |
| 2018/0159406 A1 * | 6/2018 | Blankenship | H02K 25/00 |
| 2018/0269758 A1 * | 9/2018 | You | H02K 1/17 |
| 2019/0173361 A1 * | 6/2019 | Blankenship | H02K 7/116 |

* cited by examiner

*Primary Examiner* — John K Kim

(57) ABSTRACT

An alternating pole electromagnetic rotary motor is presented. The alternating pole electromagnetic rotary motor contains a ring gear housing, a rotor assembly, a plurality of electromagnets, and a processing unit. The rotor assembly contains a gear carrier, at least one planet gear, and at least one permanent magnet. The rotor assembly is concentrically and rotatably mounted within the ring gear housing. The at least one planet gear and the at least one permanent magnet is rotatably connected and radially distributed about the gear carrier. The plurality of electromagnets is operatively coupled with the at least one permanent magnet, where the plurality of electromagnetics is used to attract and repulse at least one permanent magnet in order to generate a torque on the rotor assembly.

10 Claims, 4 Drawing Sheets

ALTERNATING POLE ELECTROMAGNETIC ROTARY MOTOR

FIELD OF THE INVENTION

The present invention relates to motors. More specifically, the present invention relates to motors that utilize electromagnets to generate mechanical torque.

BACKGROUND OF THE INVENTION

The relationship between electricity and magnetism has been explored through countless experiments, and several theories and equations have been developed to explore their interaction. The discovery that electricity could create magnetic fields, which could in turn create electrical currents, was among the greatest scientific breakthroughs of the past century. Following that discovery, induced electricity and magnetism have contributed to the skyrocketing of electronics production. Development of precision in controlling these principles has further resulted in an explosion of products and devices that exploit the relationship between magnetism and mechanical energy. This results in items which can translate or rotate as a response to the input of electrical energy and the conversion of that energy into magnetism. In particular, electric motors have been developed to fill this very need on a larger power production scale.

Such devices, however, have not yet been optimized for general use. Many of the motors developed using these principles rely on heavy rotors to generate large amounts of torque. These rotors tend to be heavy or sporting poor form factors, resulting in uneven motion and general inefficiency. Often, these motors are further specialized for use in vehicles and automobiles. Many motors that utilize electromagnetic induction are inaccessible for usage on small projects or items. What is needed is a motor capable of efficiently converting electrical energy into mechanical energy.

The present invention aims to solve these problems. The present invention utilizes a planetary gear track, a plurality of electromagnets, and a plurality of permanent magnets. The motor is operated using attraction and repulsions forces, where a permanent magnet pole is attracted to a opposite and corresponding electromagnet pole and where the permanent magnet pole pushes against a same and corresponding electromagnet pole. The permanent magnet can also be switched to a similarly sized piece of soft iron. The motor uses a combination of attraction and repulsion forces by reversing the current flow direction-which reverses the poles of the electromagnet. This happens when the permanent magnet rotates by the electromagnet. The electromagnet pulls the south pole of the permanent magnet when the permanent magnet assembly approaches the electromagnet. When the permanent magnet assembly gets approximately halfway past the electromagnet, the CPU reverses the polarity of the electromagnet, repulsing the permanent magnet, generating mechanical torque along the permanent magnet assembly.

The electromagnets are controlled by the computer. A rotary encoder tells the computer exactly where each permanent magnet assembly is. The computer turns on the corresponding electromagnet and changes the polarity of each corresponding electromagnet. With this, the motor can be tuned to turn on the electromagnets every 2nd, 3rd, 4th pass, etc. This allows the motor to be tuned to the highest efficiency. A planetary gear track can be mounted on the inside or outside of the permanent magnet assembly gear. When the track is mounted on the inside, the permanent magnet assemblies rotate in the same direction as the spindle. When the planetary gear track is mounted on the outside, the permanent magnet assembly rotates in the opposite direction as the spindle.

SUMMARY OF THE INVENTION

The present invention is an alternating pole electromagnetic rotary motor. The alternating pole electromagnetic rotary motor comprises a drive shaft, a ring gear housing, a rotor assembly, a plurality of electromagnets, and a processing unit. The rotor assembly comprises a gear carrier, at least one carrier aperture, at least one planetary gear, at least one gear axle, and at least one permanent magnet. The rotor assembly is concentrically and rotatably mounted within the ring gear housing. The at least one carrier aperture is peripherally positioned to the gear carrier. The at least one gear axle is rotatably connected to the at least one carrier aperture. The at least one planetary gear and the at least one permanent magnet is torsionally connected to the at least one gear axle. The at least one planetary gear is engaged about the ring gear housing. The drive shaft is torsionally and concentrically connected to the gear carrier. The plurality of electromagnets is radially mounted around the ring gear housing. The plurality of electromagnets is operatively coupled with the at least one permanent magnet, where the plurality of electromagnetics is used to attract and repulse at least one permanent magnet in order to generate a torque on the drive shaft. More specifically, the plurality of permanent magnets will align themselves such that the plurality of permanent magnets rotates near the plurality of electromagnets. The magnetic forces are aligned with the plurality of permanent magnets and the plurality of electromagnets. The force of the plurality of permanent magnets aligns itself such that the plurality of permanent magnets causes the at least one planetary gear to spin causing the alternating pole electromagnetic rotary motor to rotate. Similarly, when the plurality of electromagnets switches its polarity, the plurality of permanent magnets repels and aligns along the plurality of electromagnets causing the at least one planetary gear to rotate further. The plurality of electromagnets shuts off when the magnetic forces start to hinder the alternating pole electromagnetic rotary motor from rotating. The plurality of electromagnets is electronically connected to the processing unit. In one embodiment, the motor can be operated with different amounts of electromagnets and permanent magnets. In one instance, five permanent magnets can be paired with four electromagnets,

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
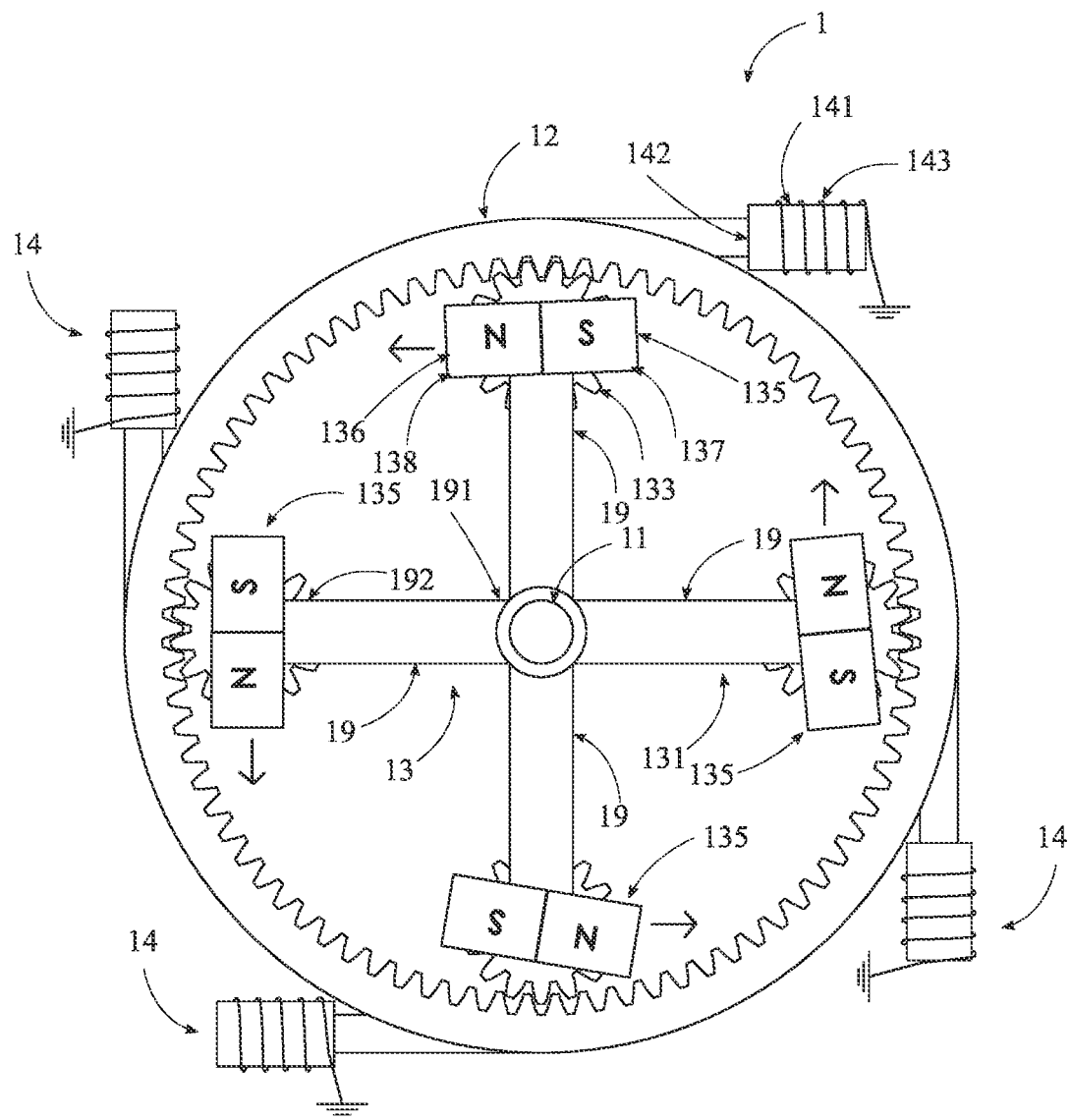
FIG. 1 is a top view of the present invention.
Figure 2:
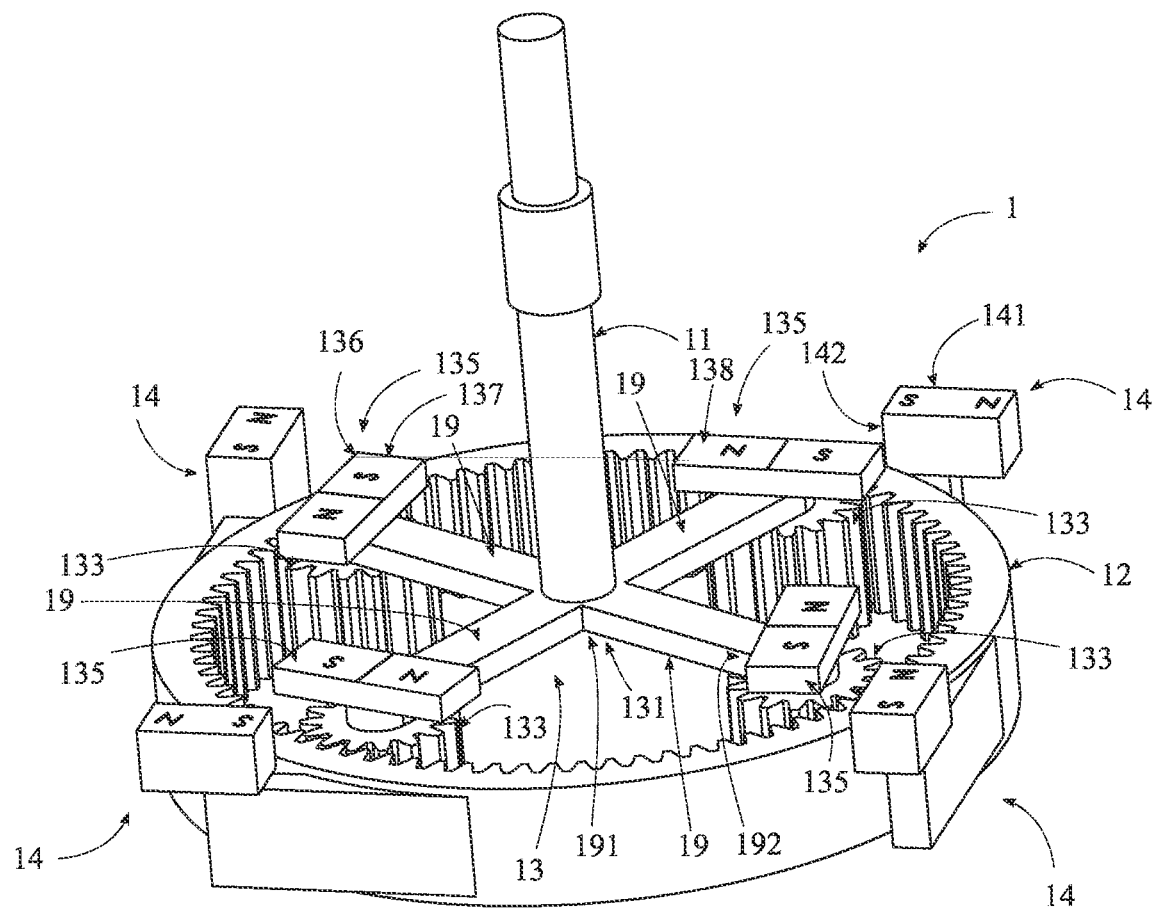
FIG. 2 is a top perspective of the present invention.
Figure 3:
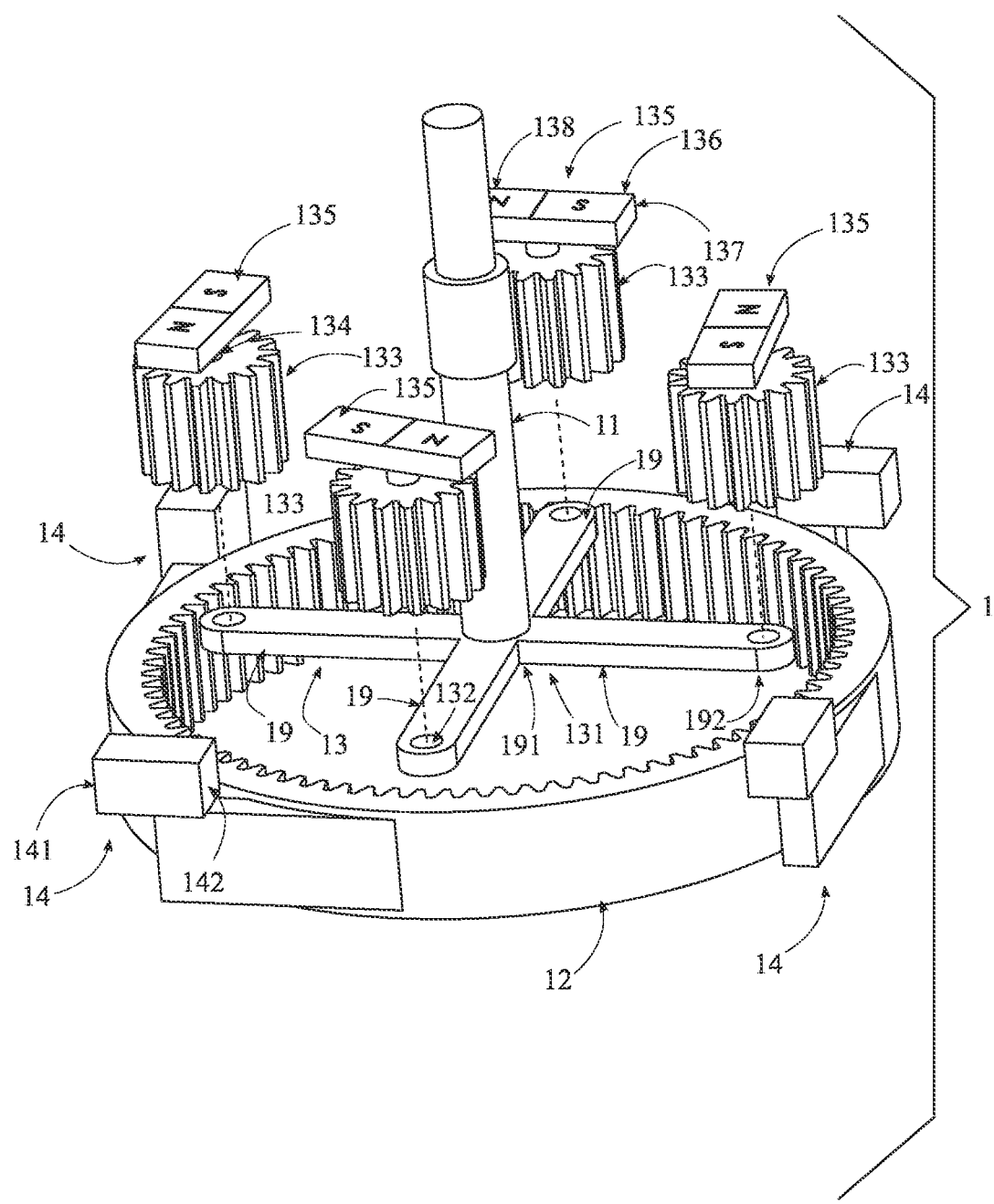
FIG. 3 is an exploded top perspective view of the present invention.

In reference to FIGS. 1-3, the present invention is an alternating pole electromagnetic rotary motor 1. In reference to FIGS. 1-3, the alternating pole electromagnetic rotary motor 1 comprises a drive shaft 11, a ring gear housing 12, a rotor assembly 13, a plurality of electromagnets 14, and a processing unit 16. The rotor assembly 13 comprises a gear carrier 131, at least one carrier aperture 132, at least one planetary gear 133, at least one gear axle 134, and at least one permanent magnet 135. The rotor assembly 13 is concentrically and rotatably mounted within the ring gear housing 12. The at least one carrier aperture 132 is peripherally positioned to the gear carrier 131. The at least one gear axle 134 is rotatably connected to the at least one carrier aperture 132. The at least one planetary gear 133 and the at least one permanent magnet 135 is torsionally connected to the at least one gear axle 134. The at least one planetary gear 133 is engaged about the ring gear housing 12. The drive shaft 11 is torsionally and concentrically connected to the gear carrier 131. The plurality of electromagnets 14 is radially mounted around the ring gear housing 12. The plurality of electromagnets 14 is operatively coupled with the at least one permanent magnet 135, where the plurality of electromagnets is used to attract and repulse at least one permanent magnet 135 in order to generate a torque on the drive shaft 11. More specifically, the plurality of permanent magnets 135 is aligned along the plurality of electromagnets 14 such that the plurality of permanent magnets 135 rotates near the plurality of electromagnets 14. The magnetic forces are aligned with the plurality of permanent magnets 135 and the plurality of electromagnets 14. The force of the plurality of permanent magnets 135 aligns itself such that the plurality of permanent magnets 135 causes the at least one planetary gear 133 to spin causing the alternating pole electromagnetic rotary motor 1 to rotate. Similarly, when the plurality of electromagnets 14 switches its polarity, the plurality of permanent magnets 135 repels and aligns along the plurality of electromagnets 14 causing the at least one planetary gear 133 to rotate further. The plurality of electromagnets 135 shuts off when the magnetic forces start to hinder the alternating pole electromagnetic rotary motor 1 from rotating. The plurality of electromagnets 14 is electronically connected to the processing unit 16. In the preferred embodiment, the alternating pole electromagnetic rotary motor 1 is suitable for generating mechanical torque for various applications, such as, but not limited to, automobile drive applications, power tools, or any other suitable application that requires sufficient mechanical torque to enable proper function of the drive system the alternating pole electromagnetic rotary motor 1 is connected to. In the preferred embodiment, the drive shaft 11 serves as the primary connection shaft that transfers torque generated by the alternating pole electromagnetic rotary motor 1 to any suitable drive mechanism.

In the preferred embodiment, the ring gear housing 12 takes the form of a planetary gearbox housing that holds and secures the components that constitutes the alternating pole electromagnetic rotary motor 1. In the preferred embodiment, the ring gear housing 12 remains stationary upon operation of the alternating pole electromagnetic rotary motor 1, where the ring gear is configured to act as a stator, and where the rotor assembly 13 spins along the ring gear. In the preferred embodiment, the rotor assembly 13 takes the form of a planetary gear rotary mechanism that engages and spins within and along the ring gear. In the preferred embodiment, the ring gear housing 12 and the rotor assembly 13 comprises a specified gear ratio, where the specified gear ratio is optimized for any type of application. In the preferred embodiment, the plurality of electromagnets 14 serves as the primary electromagnetic driving element of the alternating pole electromagnetic rotary motor 1. Working in conjunction with the at least one permanent magnet 135, the plurality of electromagnets 14 is operatively engaged with the at least one permanent magnet 135 such that the at least one permanent magnet 135 is attracted or repulsed along the plurality of electromagnets 14 to generate torque along the rotor assembly 13. In the preferred embodiment, the processing unit 16 takes the form of any suitable computer processing electronic unit suitable for executing functions that manipulate the magnetic poles of the plurality of electromagnets 14 such that the at least one permanent magnet 135 is attracted or repulsed along the plurality of electromagnets 14 to generate torque along the rotor assembly 13.

In the preferred embodiment, the gear carrier 131 takes the form of a central gear holder that secures and positions the at least one planetary gear 133 along the ring gear housing 12. Additionally, the gear carrier 131 mounts the draft shaft along the rotor assembly 13. In the preferred embodiment, the at least one planetary gear 133 and the ring gear housing 12 comprises the specified gear ratio, where the specified gear ratio is optimized for any type of application. In the preferred embodiment, the at least one carrier aperture 132 takes the form of strategically placed mounting apertures positioned along the gear carrier 131 that allows the at least one axle and the at least one planetary gear 133 to mount along the at least one carrier aperture 132 such that the at least one planetary gear 133 is positioned and engaged along the ring gear housing 12. In the preferred embodiment, the at least one permanent magnet 135 takes the form of a di-polar permanent magnet element that is repulsed or attracted along the plurality of electromagnets 14 to produce mechanical torque along the gear carrier 131.

Figure 4:
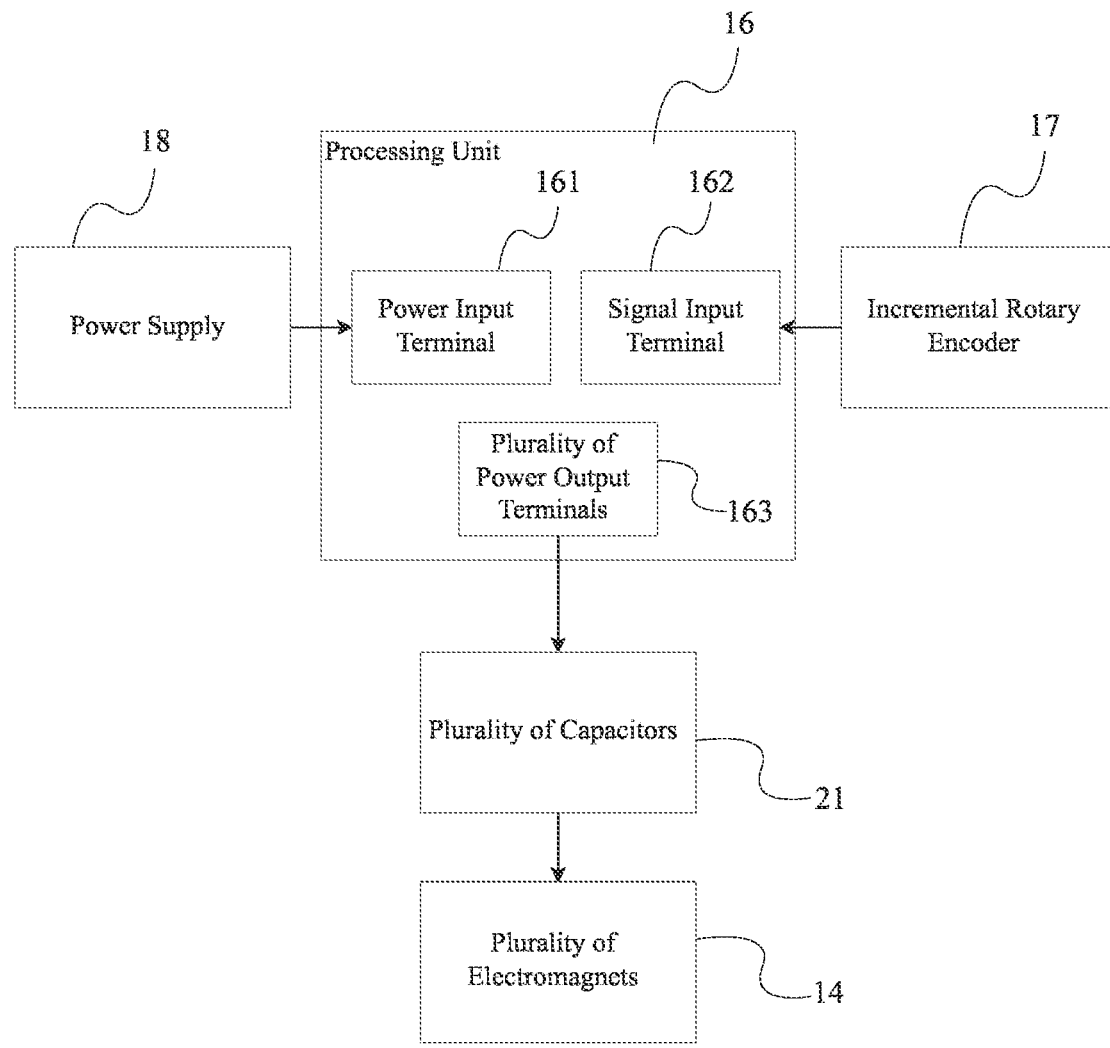
FIG. 4 is a circuit diagram used in the present invention.

In reference to FIG. 4, the alternating pole electromagnetic rotary motor 1 further comprises an incremental rotary encoder 17. The incremental rotary encoder 17 is electronically connected to the processing unit 16. In reference to FIG. 4, the alternating pole electromagnetic rotary motor 1 further comprises a power supply 18. In reference to FIGS. 1-4, each of the plurality of electromagnets 14 comprises a conductive contact 141 and an electromagnet coil 15. The conductive contact 141 for each of the plurality of electromagnets 14 is laterally mounted to the ring gear housing 12. The electromagnetic coil is in electromagnetic communication with the conductive contact 141. The electromagnetic coil for each of the plurality of electromagnets 14 is electrically connected to the power supply 18.

In reference to FIG. 4, the processing unit 16 is electronically connected to the power supply 18. In the preferred embodiment, the incremental rotary encoder 17 takes the form of a sensory feedback unit that sends positional signals of each of the plurality of permanent magnets 135 rotating along the gear carrier 131 to the processing unit 16. The processing unit 16 then controls the electrical current of each of the plurality of electromagnets 14 with the information provided by the incremental rotary encoder 17. The processing unit 16 turns on each of the plurality of electromagnets 14 and reverses the electrical current causing the polarity of said electromagnet to change, causing the plurality of electromagnets 14 to attract or repulse the at least one permanent magnet 135 such that the attraction or repulsion of the at least one permanent magnet 135 generates mechanical torque along the gear carrier 131. In the preferred embodiment, the incremental rotary encoder 17 is configured with a specified timing sequence working in conjunction with the specified gear ratio of the ring gear housing 12 and the at least one planetary gear 133. In the preferred embodiment, the power supply 18 takes the form of any suitable power supply 18 that brings electrical current along the plurality of electromagnets 14. In the preferred embodiment, the power supply 18 takes the form of a battery but may take the form of any other suitable power supply 18 dependent on the application of usage. In the preferred embodiment, the conductive contact 141 takes the form of the site where an electromagnetic field is generated, where the electromagnetic field emitted by the conductive contact 141 is directed to the at least one permanent magnet 135 such that the plurality of electromagnets 14 attract or repulse the at least one permanent magnet 135. In the preferred embodiment, the electromagnetic coil generates the electromagnetic field where the electromagnetic field generated by the electromagnetic coil is directed to the conductive contact 141. In reference to FIGS. 1-3, the conductive contact 141 comprises an interaction surface 142. The interaction surface 142 is oriented towards the at least one permanent magnet 135. The at least one permanent magnet 135 comprises a magnet body 136, a first magnetic pole end 137, and a second magnetic pole end 138.

The first magnetic pole end 137 and the second magnetic pole end 138 are positioned opposite to each other along the magnet body 136. The at least one gear axle 134 is centrally positioned in between the first magnetic pole end 137 and the second magnetic pole end 138. In the preferred embodiment, the interaction surface 142 broadcasts the electromagnetic field that the conductive contact 141 is emitting along the plurality of electromagnets 14. In the preferred embodiment, the magnet body 136 takes the form of the chassis of the at least one permanent magnet 135. In the preferred embodiment, the first magnetic pole end 137 takes the form of the north end of the magnet body 136, where the first magnetic pole end 137 is attracted to a south pole generated electromagnetic field and repulsed by a north pole generated electromagnetic field. In the preferred embodiment, the second magnetic pole end 138 takes the form of the south end of the magnet body 136, where the second magnetic pole end 138 is attracted to the north pole generated electromagnetic field and repulsed by a south pole generated electromagnetic field.

In the preferred embodiment, the at least one carrier aperture 132 is a plurality of carrier apertures 132. The at least one planetary gear 133 is a plurality of planetary gears 133. The at least one gear axle 134 is a plurality of gear axles 134. The at least one permanent magnet 135 is a plurality of permanent magnets 135. In reference to FIGS. 1-3, the gear carrier 131 comprises a plurality of carrier arms 19. In reference to FIGS. 1-3, each of the plurality of carrier arms 19 comprises a proximal arm end 191 and a distal arm end 192. The proximal arm end 191 of each of the plurality of carrier arms 19 is terminally connected to the drive shaft 11. Each of the plurality of carrier apertures 132 is peripherally positioned to a corresponding arm from the plurality of carrier arms 19. Each of the plurality of gear axles 134 is rotatably connected to a corresponding aperture from the plurality of carrier apertures 132. Each of the plurality of planetary gears 133 and each of the plurality of permanent magnets 135 are torsionally connected to a corresponding axle from the plurality of gear axles 134. Each of the plurality of planetary gears 133 is engaged about the ring gear housing 12. In the preferred embodiment, the plurality of carrier arms 19 takes the form of gear mounting arms that mount the plurality of planetary gears 133 along the gear carrier 131. In the preferred embodiment, the proximal arm end 191 is oriented towards the central position of the gear carrier 131 and drive shaft 11, where each proximal arm of the plurality of carrier arms 19 are connected to each other along the centrally positioned drive shaft 11. In the preferred embodiment, each distal arm end 192 of the plurality of carrier arms 19 are peripherally distributed along the ring gear housing 12 such that the distal arm end 192 supports and positions the plurality of planetary gears 133.

In another embodiment, the alternating pole electromagnetic rotary motor 1 further comprises a plurality of capacitors 21, as shown in FIG. 4. The processing unit 16 comprises a power input terminal 161, a signal input terminal 162, and a plurality of power output terminals 163. The power supply 16 is electrically connected to the power input terminal 161. The incremental rotary encoder 17 is electronically connected to the signal input terminal 162. The plurality of capacitors 21 is electronically connected to the plurality of output terminals 163. The plurality of electromagnets 14 is electronically connected to the plurality of capacitors 21. In this embodiment, the plurality of capacitors 21 holds the electrical energy outputted by the plurality of power output terminals 163 such that the correct voltage and amperage is provided along the plurality of electromagnets 14. More specifically, the processing unit 16 controls the plurality of capacitors 21 such that the plurality of capacitors 21 activates or changes the polarity of the plurality of electromagnets 14. Control functions of the processing unit 16 are dependent on the sensory feedback generated by the incremental rotary encoder 17 wired to the signal input terminal 162.

Although the invention has been explained in relation to its preferred embodiment, it is to be understood that many other possible modifications and variations can be made without departing from the spirit and scope of the invention as hereinafter claimed.

What is claimed is:
1. An alternating pole electromagnetic rotary motor comprising:
   a drive shaft;
   a ring gear housing;
   a rotor assembly;
   a plurality of electromagnets;
   a processing unit;
   the rotor assembly comprising a gear carrier, at least one carrier aperture, at least one planetary gear, at least one gear axle, and at least one permanent magnet;
   the rotor assembly being concentrically and rotatably mounted within the ring gear housing;
   the at least one carrier aperture being peripherally positioned to the gear carrier;
   the at least one gear axle being rotatably connected to the at least one carrier aperture;
   the at least one planetary gear and the at least one permanent magnet being torsionally connected to the at least one gear axle;
   the at least one planetary gear being engaged about the ring gear housing;

the drive shaft being torsionally and concentrically connected to the gear carrier;

the plurality of electromagnets being radially mounted around the ring gear housing;

the plurality of electromagnets being operatively coupled with the at least one permanent magnet, wherein the plurality of electromagnets is used to attract and repulse at least one permanent magnet in order to generate a torque on the drive shaft;

the plurality of electromagnets being electronically connected to the processing unit;

the at least one carrier aperture being a plurality of carrier apertures;

the at least one planetary gear being a plurality of planetary gears;

the at least one gear axle being a plurality of gear axles;

the at least one permanent magnet being a plurality of permanent magnets;

the gear carrier comprising a plurality of carrier arms;

each of the plurality of carrier arms comprising a proximal arm end and a distal arm end;

the proximal arm end of each of the plurality of carrier arms being terminally connected to the drive shaft;

each of the plurality of carrier apertures being peripherally positioned to a corresponding arm from the plurality of carrier arms;

each of the plurality of gear axles being rotatably connected to a corresponding aperture from the plurality of carrier apertures;

each of the plurality of planetary gears and each of the plurality of permanent magnets being torsionally connected to a corresponding axle from the plurality of gear axles; and each of the plurality of planetary gears being engaged about the ring gear housing.

2. The alternating pole electromagnetic rotary motor as claimed in claim 1 comprising:

an incremental rotary encoder; and the incremental rotary encoder being electronically connected to the processing unit.

3. The alternating pole electromagnetic rotary motor as claimed in claim 1 comprising:

a plurality of capacitors;

a power supply;

an incremental rotary encoder;

the processing unit comprising a power input terminal, a signal input terminal, and a plurality of power output terminals;

the power supply being electrically connected to the power input terminal;

the incremental rotary encoder being electronically connected to the signal input terminal;

the plurality of capacitors being electronically connected to the plurality of output terminals; and the plurality of electromagnets being electronically connected to the plurality of capacitors.

4. The alternating pole electromagnetic rotary motor as claimed in claim 1 comprising:

a power supply;

each of the plurality of electromagnets comprising a conductive contact and an electromagnet coil;

the conductive contact for each of the plurality of electromagnets being laterally mounted to the ring gear housing;

the electromagnetic coil being in electromagnetic communication with the conductive contact;

the electromagnetic coil for each of the plurality of electromagnets being electrically connected to the power supply; and the processing unit being electronically connected to the power supply.

5. The alternating pole electromagnetic rotary motor as claimed in claim 4 comprising:

the conductive contact comprising an interaction surface; and the interaction surface being oriented towards the at least one permanent magnet.

6. The alternating pole electromagnetic rotary motor as claimed in claim 1 comprising:

the at least one permanent magnet comprising a magnet body, a first magnetic pole end, and a second magnetic pole end;

the first magnetic pole end and the second magnetic pole end being positioned opposite to each other along the magnet body; and the at least one gear axle being centrally positioned in between the first magnetic pole end and the second magnetic pole end.

7. An alternating pole electromagnetic rotary motor comprising:

a drive shaft;

a ring gear housing;

a rotor assembly;

a plurality of electromagnets;

a processing unit;

a power supply;

an incremental rotary encoder;

the rotor assembly comprising a gear carrier, at least one carrier aperture, at least one planetary gear, at least one gear axle, and at least one permanent magnet;

each of the plurality of electromagnets comprising a conductive contact and an electromagnet coil;

the rotor assembly being concentrically and rotatably mounted within the ring gear housing;

the at least one carrier aperture being peripherally positioned to the gear carrier;

the at least one gear axle being rotatably connected to the at least one carrier aperture;

the at least one planetary gear and the at least one permanent magnet being torsionally connected to the at least one gear axle;

the at least one planetary gear being engaged about the ring gear housing;

the drive shaft being torsionally and concentrically connected to the gear carrier;

the plurality of electromagnets being radially mounted around the ring gear housing;

the plurality of electromagnets being operatively coupled with the at least one permanent magnet, wherein the plurality of electromagnetics is used to attract and repulse at least one permanent magnet in order to generate a torque on the drive shaft;

the plurality of electromagnets being electronically connected to the processing unit;

the conductive contact for each of the plurality of electromagnets being laterally mounted to the ring gear housing;

the electromagnetic coil being in electromagnetic communication with the conductive contact;

the electromagnetic coil for each of the plurality of electromagnets being electrically connected to the power supply;

the processing unit being electronically connected to the power supply, and the incremental rotary encoder being electronically connected to the processing unit.

8. The alternating pole electromagnetic rotary motor as claimed in claim 7 comprising:

the conductive contact comprising an interaction surface; and the interaction surface being oriented towards the at least one permanent magnet.

9. The alternating pole electromagnetic rotary motor as claimed in claim 7 comprising:

the at least one permanent magnet comprising a magnet body, a first magnetic pole end, and a second magnetic pole end;

the first magnetic pole end and the second magnetic pole end being positioned opposite to each other along the magnet body; and the at least one gear axle being centrally positioned in between the first magnetic pole end and the second magnetic pole end.

10. The alternating pole electromagnetic rotary motor as claimed in claim 7 comprising:

the at least one carrier aperture being a plurality of carrier apertures;

the at least one planetary gear being a plurality of planetary gears;

the at least one gear axle being a plurality of gear axles;

the at least one permanent magnet being a plurality of permanent magnets;

the gear carrier comprising a plurality of carrier arms;

each of the plurality of carrier arms comprising a proximal arm end and a distal arm end;

the proximal arm end of each of the plurality of carrier arms being terminally connected to the drive shaft;

each of the plurality of carrier apertures being peripherally positioned to a corresponding arm from the plurality of carrier arms;

each of the plurality of gear axles being rotatably connected to a corresponding aperture from the plurality of carrier apertures;

each of the plurality of planetary gears and each of the plurality of permanent magnets being torsionally connected to a corresponding axle from the plurality of gear axles; and each of the plurality of planetary gears being engaged about the ring gear housing.

\* \* \* \* \*